US010462008B2

(12) United States Patent
Wei et al.

(10) Patent No.: US 10,462,008 B2
(45) Date of Patent: Oct. 29, 2019

(54) CART MODE PROVISIONING OF SHARED COMPUTING DEVICES

(71) Applicant: Microsoft Technology Licensing, LLC, Redmond, WA (US)

(72) Inventors: Yaou Wei, Redmond, WA (US); Shrikesh Himanshu Tanna, Seattle, WA (US); Steven Joseph Tricanowicz, Seattle, WA (US); Anshul Rawat, Kirkland, WA (US); Tyler J. Donahue, Bellevue, WA (US); Michael H. Krause, Redmond, WA (US); Christopher Ronald Anthony, Bellevue, WA (US); Phillip Feng Lu, Kirkland, WA (US); Victoria Elizabeth Milton, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 15/375,751

(22) Filed: Dec. 12, 2016

(65) Prior Publication Data
US 2017/0317879 A1 Nov. 2, 2017

Related U.S. Application Data

(60) Provisional application No. 62/329,920, filed on Apr. 29, 2016.

(51) Int. Cl.
*H04L 12/24* (2006.01)
*G06F 13/38* (2006.01)
(Continued)

(52) U.S. Cl.
CPC .......... *H04L 41/084* (2013.01); *G06F 13/385* (2013.01); *G06F 13/4282* (2013.01);
(Continued)

(58) Field of Classification Search
CPC ... H04L 63/0838; H04L 67/34; H04L 9/0863; H04L 9/3228
See application file for complete search history.

(56) References Cited

U.S. PATENT DOCUMENTS 7,565,418 B2     7/2009   Ferrari et al.
7,933,231 B1 *   4/2011   Huang ................ H04L 41/0806
                                                                      370/312
(Continued)

FOREIGN PATENT DOCUMENTS

WO       WO-9948010       9/1999

OTHER PUBLICATIONS

"Shared device setup", Published on: Apr. 6, 2015 Available at: https://support.google.com/edu/android/answers/6012728.
(Continued)

*Primary Examiner* — Barbara B Anyan

(57) ABSTRACT

Cart mode provisioning of shared computing devices refers to provisioning or configuring the shared computing devices so that the shared computing devices operate in an appropriate mode for a particular shared usage environment. Such a shared usage environment can be, for example, a school environment in which the appropriate mode is a mode in which the shared computing devices are locked so that a limited number of programs and network accessibility is available to the shared computing devices. A user of a setup computing device selects some preferences regarding the setup of the shared computing devices, and a configuration package is generated that includes various configuration information based on the user selections. The configuration package is then made available to the shared computing devices, which are configured or provisioned in accordance with the configuration information.

20 Claims, 13 Drawing Sheets

(51) Int. Cl.
  *G06F 13/42* (2006.01)
  *H04L 29/08* (2006.01)
  *G06F 8/60* (2018.01)
  *G06F 8/61* (2018.01)
  *H04W 12/00* (2009.01)

(52) U.S. Cl.
  CPC ...... *H04L 41/0806* (2013.01); *H04L 41/0813* (2013.01); *H04L 67/146* (2013.01); *G06F 8/60* (2013.01); *G06F 8/61* (2013.01); *H04L 41/0886* (2013.01); *H04W 12/00522* (2019.01)

(56) References Cited

U.S. PATENT DOCUMENTS

| | | |
|---|---|---|
| 8,578,059 B2 | 11/2013 | Odayappan et al. |
| 8,887,262 B1 | 11/2014 | Turner et al. |
| 8,910,234 B2 | 12/2014 | Morgan et al. |
| 2003/0055928 A1 | 3/2003 | Machida |
| 2005/0114315 A1* | 5/2005 | Tanner ............... H04L 41/0813 |
| 2005/0193100 A1 | 9/2005 | Woolf et al. |
| 2012/0005325 A1 | 1/2012 | Kanodia |
| 2013/0086260 A1 | 4/2013 | Biazetti et al. |
| 2013/0191896 A1 | 7/2013 | Adderly et al. |
| 2014/0165165 A1 | 6/2014 | Story, Jr. |
| 2015/0142974 A1 | 5/2015 | Bemaudin et al. |
| 2015/0254067 A1* | 9/2015 | Nigam ..................... G06F 8/61 717/175 |
| 2015/0273329 A1* | 10/2015 | Saito .................... A63F 13/355 463/42 |
| 2015/0278145 A1* | 10/2015 | Saito .................. G06F 13/4027 710/308 |
| 2016/0050116 A1 | 2/2016 | Sheshadri et al. |
| 2016/0328222 A1* | 11/2016 | Arumugam ............... G06F 8/60 |
| 2017/0288786 A1* | 10/2017 | Al-Mousa .............. H04B 11/00 |

OTHER PUBLICATIONS

"Provision the device on startup", Published on: Aug. 13, 2015 Available at: https://msdn.microsoft.com/en-us/library/dn499751.aspx.

"Deploying Apple iOS in Education", In White Paper of Meraki, Mar. 2013, pp. 1-18.

Decker, et al., "Provisioning packages", Retrieved on: May 9, 2016 Available at: https://technet.microsoft.com/en-us/itpro/windows/whats-new/new-provisioning-packages.

"IntelliGO—An Intelligent Solution for the Mobile Enterprise", Retrieved on: May 9, 2016 Available at: http://spyders.ca/wp-content/uploads/2014/06/IntelliGO-Solution-Overview.pdf.

"International Search Report and Written Opinion", Application No. PCT/US2017/029233, dated Jul. 7, 2017, 11 pages.

* cited by examiner

Shared Cart

① — ② — ③

Pick a name for this group of student PCs

| Lakewood_Cart_01 |
| Lakewood_Cart_02 |
| Lakewood_Cart_03 |
| Lakewood_Cart_04 |
| Lakewood_Cart_05 |

Previous    Next

Fig. 5

Shared Cart

① — ② — ③

Can classroom PCs be used without accounts?

● No (recommended – always use their student IDs)
○ Yes (passwords or user names aren't required)

[ Previous ]  [ Next ]

Fig. 6

CART MODE PROVISIONING OF SHARED COMPUTING DEVICES

RELATED APPLICATIONS

This application claims priority to U.S. Provisional Application No. 62/329,920, filed Apr. 29, 2016, entitled "Cart Mode Provisioning Of Shared Computing Devices", to Wei, et al., the disclosure of which is hereby incorporated by reference herein in its entirety.

BACKGROUND

Situations arise in which a group of computing devices is shared by multiple users. For example, a school may have a cart of computing devices that can be used by different students throughout the day. Configuring and maintaining such shared computing devices, however, can be a time-consuming and burdensome task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a setup computing device a shared device setup tool is obtained. User input specifying configuration information for a set of shared computing devices is received, the configuration information including a name for the set of shared computing devices, at least one supported login type for the set of shared computing devices, and a network for the set of shared devices. A shared device configuration package is generated, the shared device configuration package including the specified configuration information as well as additional configuration information, the additional configuration information including credentials for the set of shared computing devices to access the network. The shared device configuration package is stored for transfer to each shared computing device in the set of shared computing devices.

In accordance with one or more aspects, in a shared computing device, the presence of a shared device configuration package accessible to the shared computing device is recognized. Configuration information identified by the shared device configuration package is obtained, the configuration information including credentials for the shared computing device to access a network and types of user logins to be supported by the shared computing device. The shared computing device is configured in accordance with the shared device configuration package. User logins are allowed to the shared computing device as indicated by the types of user logins to be supported by the shared computing device, and user accounts are managed on the shared computing device over time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 4, 5, 6, 7, 8, 9, 10, 11, and 12 illustrate example user interfaces during the usage of the techniques discussed herein.

DETAILED DESCRIPTION

Cart mode provisioning of shared computing devices is discussed herein. The cart mode provisioning refers to provisioning or configuring the shared computing devices so that the shared computing devices operate in an appropriate mode for a particular shared usage environment. Such a shared usage environment can be, for example, a school environment in which the appropriate mode is a mode in which the shared computing devices are locked so that a limited number of programs and network accessibility is available to the shared computing devices. By way of another example, a shared usage environment can be a facility floor (e.g., a shop floor, a warehouse floor) in which the appropriate mode is a mode in which the shared computing devices automatically run one or more programs on login and have access to a particular set of networks.

A user of a setup computing device selects some preferences regarding the setup of the shared computing devices, such as a name for the set of shared computing devices, login types (e.g., anonymous and/or user account) to be supported by the set of shared computing devices, and a network to be accessed by the shared computing devices. The setup computing device generates a configuration package that includes various configuration information based on the user selections. The configuration package is then made available to the shared computing devices and, for each shared computing device, a configuration module on the shared computing device configures or provisions the shared computing device in accordance with the configuration information.

When provisioning shared computing devices, multiple shared computing devices are typically provisioned or configured to operate the same. For example, a teacher may provision or configure 30 shared computing devices in a cart for a classroom to use, and different students use those shared computing devices throughout the day. The techniques discussed herein provide a convenient, low friction, easy to use tool that a teacher or other user can use to get the shared computing devices ready for use (e.g., for use by the students in a classroom). This provides a time saving way for the teacher or other user to configure the shared computing devices and ensure that all of the shared computing devices are configured in the same manner. The techniques discussed herein further provide account management functionality over time, alleviating the teacher or other user from the burden of at least some management and maintenance on the shared computing devices over time.

Figure 1:
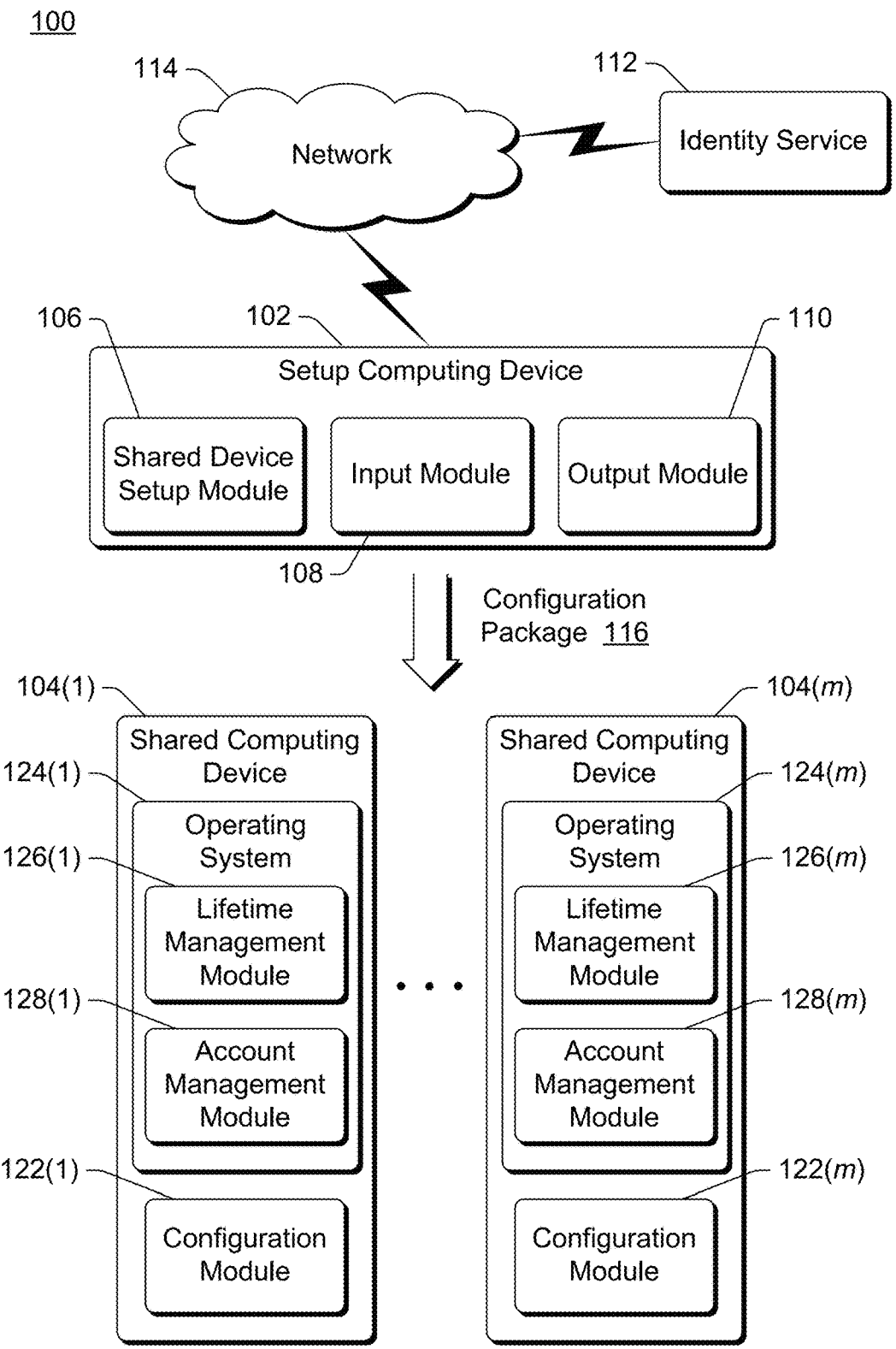
FIG. 1 illustrates an example system implementing the cart mode provisioning of shared computing devices in accordance with one or more embodiments.

FIG. 1 illustrates an example system 100 implementing the cart mode provisioning of shared computing devices in accordance with one or more embodiments. The system 100 includes a setup computing device 102, which can be a variety of different types of devices, such as a desktop computer, a laptop or netbook computer, a mobile device (e.g., a tablet or phablet device, a cellular or other wireless phone (e.g., a smartphone), a notepad computer, a mobile station), and so forth. Additionally or alternatively the setup computing device 102 can be a variety of other types of computing devices, such as a server computer, a wearable device (e.g., eyeglasses, head-mounted display, watch, bracelet, a virtual reality (VR) device, an augmented reality (AR) device), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the setup computing device 102 may range from full resource devices with substantial memory and processor resources (e.g., personal computers, game consoles) to low-resource devices with limited memory and/or processing resources (e.g., traditional set-top boxes, hand-held game consoles).

The setup computing device 102 is used by a teacher or other user to setup multiple (m) shared computing devices 104(1), . . . , 104(m). The setup computing device 102 includes a shared device setup module 106, which is a tool used to generate a configuration package that is used to configure the shared computing devices 104. In one or more embodiments, the shared device setup module 106 is an application obtained by the setup computing device 102 from an application store. Additionally or alternatively, the shared device setup module 106 can be obtained in other manners, such as being pre-configured in the setup computing device 102 or otherwise installed on or downloaded to the setup computing device 102.

The setup computing device 102 also includes a user input module 108 that receives user inputs from a user of the computing device 102. User inputs can be provided in a variety of different manners, such as by pressing one or more keys of a keypad or keyboard of device 102, pressing one or more keys of a controller (e.g., remote control device, mouse, track pad, etc.) of device 102, pressing a particular portion of a touchpad or touchscreen of device 102, making a particular gesture on a touchpad or touchscreen of device 102, and/or making a particular gesture on a controller (e.g., remote control device, mouse, track pad, etc.) of device 102. User inputs can also be provided via other physical feedback input to device 102, such as tapping any portion of device 102, an action that can be recognized by a motion detection or other component of device 102 (such as shaking device 102, rotating device 102, bending or flexing device 102, etc.), and so forth. User inputs can also be provided in other manners, such as via voice or other audible inputs to a microphone, via motions of hands or other body parts observed by an image capture device, and so forth.

The setup computing device 102 also includes an output module 110 that generates, manages, and/or outputs content for display, playback, and/or other presentation. This content can be created by the output module itself or obtained from other modules of the computing device 102. This content can be, for example, a display or playback portion of a user interface (UI). The content can be displayed or otherwise played back by components of computing device 102 (e.g., speakers, interactive display devices, etc.). Alternatively, the output module can generate one or more signals that are output to other devices or components (e.g., speakers, display devices, etc.) that are separate from computing device 102.

The setup computing device 102 can also communicate with an identity service 112 via a network 114. Network 114 can be a variety of different networks, such as the Internet, a local area network (LAN), a public telephone network, an intranet, other public and/or proprietary networks, combinations thereof, and so forth. The identity service 112 can be any of a variety of different services or systems that manage accounts or identities on a network. For example, the identity service 112 can be an Active Directory® service, an Azure™ Active Directory® service, and so forth.

Each shared computing device 104 can be any of a variety of different types of devices. Oftentimes the different shared computing devices 104 are the same types of devices, although alternatively different ones of the shared computing devices 104 can be different types of devices. For example, a shared computing device 104 can be a desktop computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, a virtual reality (VR) device, an augmented reality (AR) device), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, and so forth. Thus, each shared computing device 104 may range from a full resource device with substantial memory and processor resources (e.g., personal computers, game consoles) to a low-resource device with limited memory and/or processing resources (e.g., traditional set-top boxes, hand-held game consoles).

The shared device setup module 106 generates a configuration package 116 (also referred to as a shared device configuration package) used to configure each of the shared computing devices 104 as discussed in more detail below. Each shared computing device 104 includes a configuration module 122 that obtains the configuration package 116 and configures an operating system 124 on the shared computing device 104 in accordance with the configuration package 116. The configuration package 116 can be made available to the configuration module 122 in a variety of different manners. For example, the configuration package 116 can be stored on a universal serial bus (USB) drive and plugged into a USB port of the shared computing device 104. Various other wired or wireless communication protocols can additionally or alternatively be used, such as near field communication (NFC), wireless USB, and so forth.

By way of another example, the configuration package 116 can be implemented as quick response (QR) code that is displayed by the setup computing device 102 (or transferred to another device for display). A camera or other imaging sensor of the shared computing device 104 captures and provides the QR code to the configuration module 122, which decodes the QR code. Embedded in the QR code can be a link (e.g., a uniform resource locator (URL)) indicating a network location to access (e.g., via the network 114) to obtain configuration information. The QR code can also optionally have encoded therein credentials (e.g., wireless network name (e.g., service set identifier (SSID) and optionally password) allowing the shared computing device 104 to access the network 114.

The operating system 124 of each shared computing device 104 can be configured in a variety of different modes that are appropriate for different shared usage environments. These configurations can include restrictions on what programs can be run on the shared computing device 104, what parts of the shared computing device 104 can be accessed (e.g., which files or directories on the shared computing device 104 can be read from or written to), which (or whether) networks can be accessed, which network locations (e.g., which Web sites) can be accessed, and so forth. For example, for a school environment, the operating system 124 can be configured to run a limited number of programs (e.g., a productivity suite such as a word processing program, a spreadsheet program, an image editing program, etc.) and access only a particular wireless network. By way of another example, the operating system 124 can be configured to run only a particular program and/or access only a particular Web site, effectively locking each the shared computing device 104 to running only that particular program and/or accessing only that particular Web site. Such locking can be useful in various situations, such as a "secure assessment" situation in which users of the shared computing devices 104 are taking a test or otherwise being assessed in some manner.

The operating system 124 of each shared computing device 104 includes a lifetime management module 126 and an account management module 128. The lifetime management module 126 provides various maintenance and management of the shared computing device 104 over time. In one or more embodiments, the lifetime management module 126 monitors the usage of accounts on the shared computing device 104, such as how frequently the accounts are logged into on the shared computing device 104, how long an account is logged in for (e.g., the amount of time between logon and logoff for the account), and so forth. The lifetime management module 126 also monitors available resources in the shared computing device 104, such as the amount of storage space available on the shared computing device 104. In response to available resources running low (e.g., an amount of available space on a storage device dropping below a threshold amount, such as a particular number of bytes (e.g., 64 Gigabytes) or a percentage (e.g., 30%) of the total storage capacity of the storage device), the lifetime management module 126 deletes one or more accounts from the shared computing device 104. Which account(s) are deleted can be determined in different manners based on the usage of the accounts, such as the least frequently used account(s), the least recently used account(s), and so forth.

The account management module 128 manages accounts on the shared computing device 104. This management includes, for example, maintaining a record of the accounts. In one or more embodiments, the account management module 128 also supports a temporary account, as discussed in more detail below.

Figure 2:
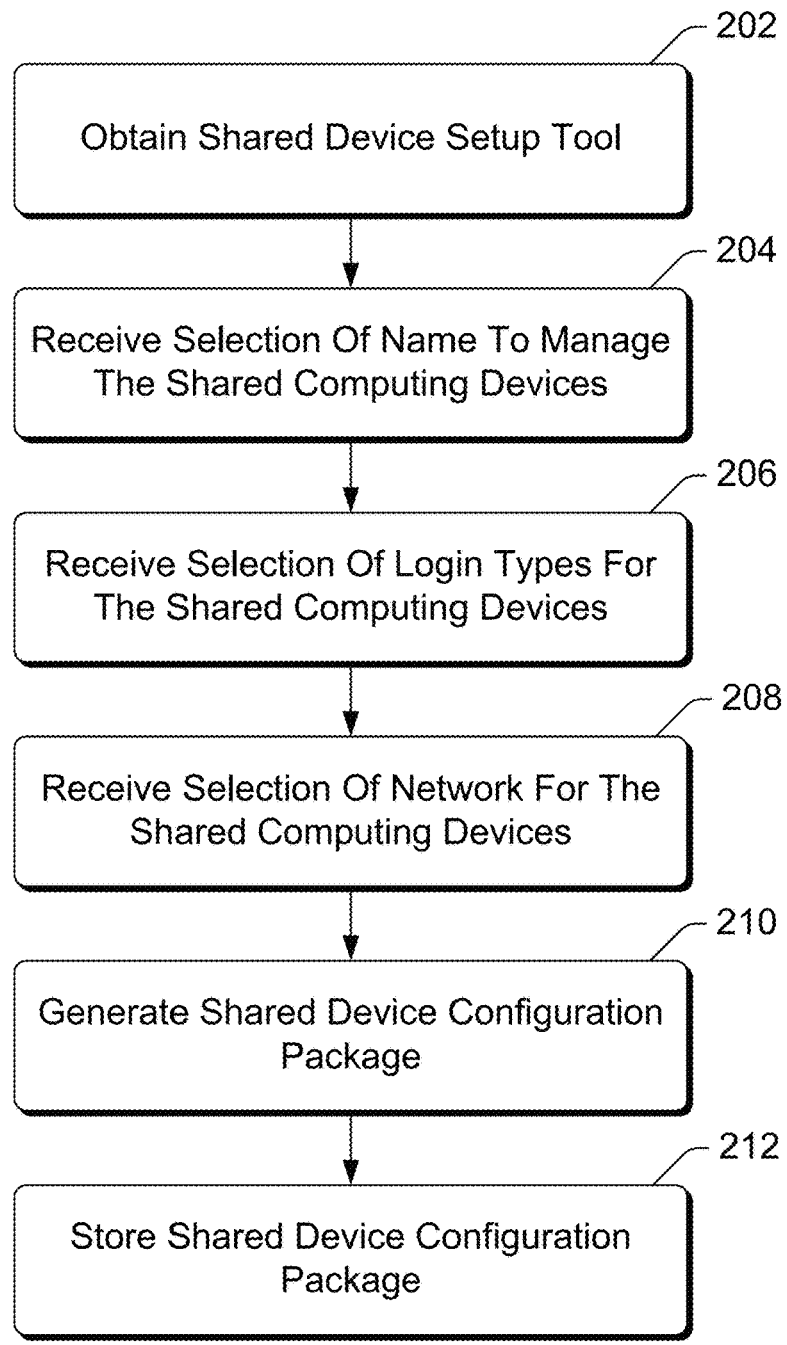
FIG. 2 is a flowchart illustrating an example process for implementing the cart mode provisioning of shared computing devices in accordance with one or more embodiments.

FIG. 2 is a flowchart illustrating an example process 200 for implementing the cart mode provisioning of shared computing devices in accordance with one or more embodiments. Process 200 is carried out by a setup computing device, such as the setup computing device 102 of FIG. 1, and can be implemented in software, firmware, hardware, or combinations thereof. Process 200 is shown as a set of acts and is not limited to the order shown for performing the operations of the various acts. Process 200 is an example process for implementing the cart mode provisioning of shared computing devices; additional discussions of implementing the cart mode provisioning of shared computing devices are included herein with reference to different figures.

In process 200, a shared device setup tool is obtained (act 202). The shared device setup tool is, for example, the shared device setup module 106 of FIG. 1. The shared device setup tool can be obtained in various manners, such as being downloaded from an application store via the Internet.

A selection of a name to manage the shared devices is received (act 204). This allows the set of multiple shared computing devices to be referred to and managed under a common name. This selected name is optionally provided to the identity service 112 (e.g., by the device implementing the process 200, or by one or more of the shared computing devices).

A selection of login types for the shared computing devices is also received (act 206). The selection can be made to require users of the shared computing devices to login with their user account (e.g., as verified by the identity service 112), to allow users to login anonymously (e.g., providing no user name or account), or to allow the user to choose whether to login with their user account or anonymously.

A selection of networks for the shared computing devices is also received (act 208). The selection of networks refers to the networks that the shared computing devices are permitted to access.

A shared device configuration package is generated (act 210). The shared device configuration package includes various information, such as the selected name (as received in act 204), the selected login types (as received in act 206), and the selected network (as received in act 208). Various additional information can also be included in the shared device configuration package, such as credentials for the set of shared computing devices to access the selected network. For example, the network name (and optionally a password) to access the selected network (e.g., a Wi-Fi network) can be included in the shared device configuration package.

The shared device configuration package is stored (act 212). In one or more embodiments, the shared device configuration package is stored to a USB drive. Additionally or alternatively, the shared device configuration package can be stored elsewhere to allow the shared device configuration package to be made available to the shared computing devices in other manners. For example, the shared device configuration package can be saved for transmission via NFC or wireless USB, at least part of the configuration package can be saved in a network location (e.g., a network server or data store), part of the shared device configuration package can be encoded in a QR code and another part of the shared device configuration package can be stored in a network location (an URL or other identifier of the network location being encoded in the QR code), and so forth.

Figure 3:
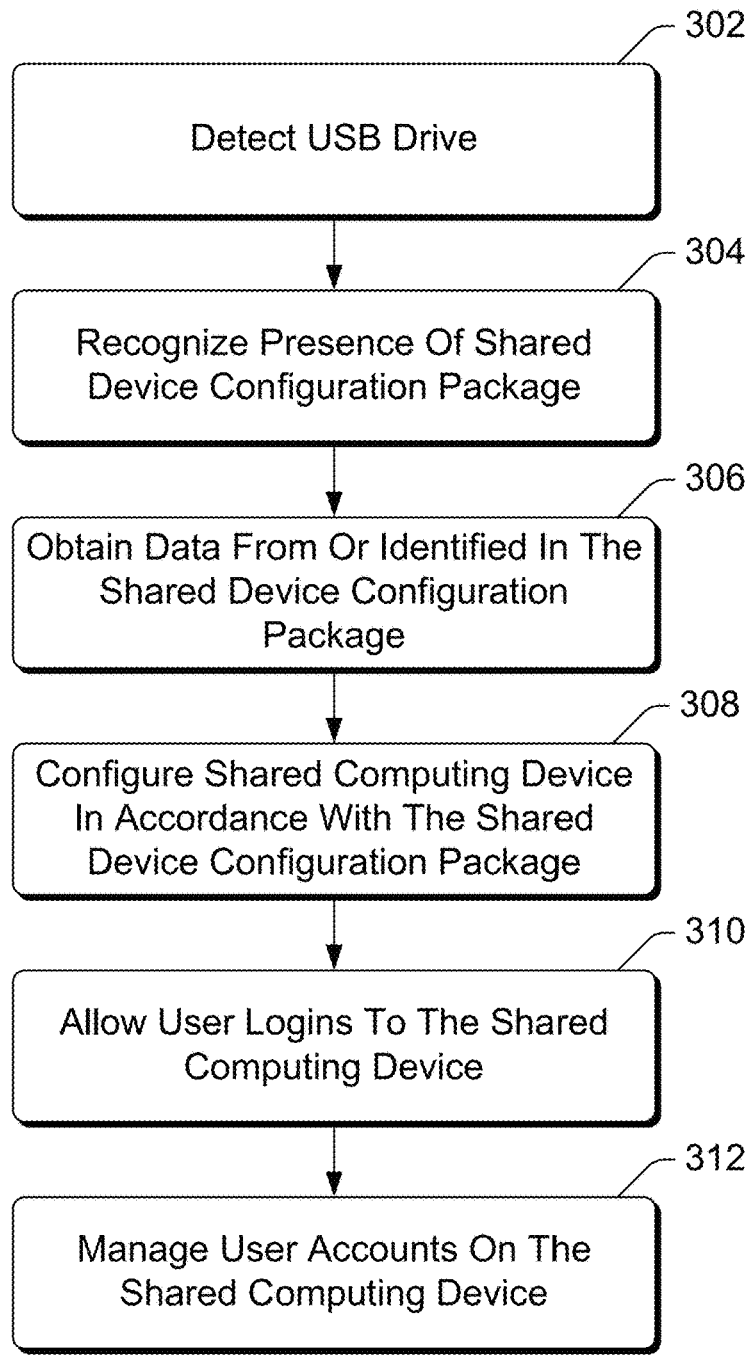
FIG. 3 is a flowchart illustrating another example process for implementing the cart mode provisioning of shared computing devices in accordance with one or more embodiments.

FIG. 3 is a flowchart illustrating an example process 300 for implementing the cart mode provisioning of shared computing devices in accordance with one or more embodiments. Process 300 is carried out by a shared computing device, such as one of the shared computing devices 104 of FIG. 1, and can be implemented in software, firmware, hardware, or combinations thereof. Process 300 is shown as a set of acts and is not limited to the order shown for performing the operations of the various acts. Process 300 is an example process for implementing the cart mode provisioning of shared computing devices; additional discussions of implementing the cart mode provisioning of shared computing devices are included herein with reference to different figures.

In process 300, a USB drive is detected (act 302). The USB drive is detected, for example, when the USB drive is inserted into a USB port of the shared computing device implementing process 300. Alternatively, in situations in which the shared device configuration package is provided to the shared computing devices in manners other than a USB drive, process 300 need not include act 302.

The presence of a shared device configuration package is recognized (act 304). The presence can be recognized in different manners, such as by a flag or other setting (e.g., on the USB drive or at a particular network location), by the presence of a particular file or file name (e.g., on the USB drive or at a particular network location), by the sending of a particular signal, and so forth.

Data (configuration information) identified in the shared device configuration package is obtained (act 306). The data can be obtained from the shared device configuration package itself and/or from a location indicated in the shared device configuration package (e.g., from a location specified by an URL included in the shared device configuration package).

The shared computing device is configured in accordance with the shared device configuration package (act 308). This configuration is performed by, for example, the configuration module 122 of FIG. 1. The specific manner in which the configuration is performed can vary based on the configuration information included in or otherwise identified by the shared device configuration package. This configuration can include, for example, altering settings of the operating system of the shared computing device, installing programs on the shared computing device, deleting programs from the shared computing device, changing a format of a menu or start screen, changing a background or wallpaper displayed by the shared computing device, restricting access to particular networks (e.g., the network that was selected in act 204 of FIG. 2), restricting access to particular network locations (e.g., Web sites), restricting which programs can be run on the computing device, and so forth.

In one or more embodiments, the configuration also includes providing particular operating system settings, deleting particular programs or portions of the operating system, disabling (or otherwise not running) particular programs or portions of the operating system, and so forth. This configuration settings can allow, for example, and efficient and fast logon process, allowing users to logon to the shared computing device quickly.

The shared computing device allows user logins to the shared computing device (act 310). These logins may be logins with particular user accounts or anonymous logins as discussed above. Which types of logins are allowed in act 310 depends on the information included in the configuration information included in or otherwise identified by the shared device configuration package (e.g., the login type(s) that was selected in act 206 of FIG. 2).

User accounts on the shared computing device are also managed (act 312). This management includes determining when to delete an account from the shared computing device based on resource usage in the shared computing device as discussed above. This helps reduce the maintenance and management that a user (e.g., a teacher) may need to perform on the computing devices. For example, a teacher need not go through each of 30 different shared computing devices over the summer to delete accounts of students that are not in his or her class next year. Rather, the teach can rely on the shared computing device to delete accounts that are no longer needed as desired by the shared computing device (e.g., in response to resources running low).

In one or more embodiments, while a user is logged into his or her account, any data or information that is generated or saved by the user is saved at a remote location (e.g., in the cloud). This remote location is, for example, a server or other data store coupled to a network (e.g., the network 114 of FIG. 1). The data or information can be user data (e.g., user content that is generated by the user), setting information (e.g., operating system setting preferences such as display settings), and so forth. A copy of the data can be (but need not be) saved locally on the shared computing device as associated with (e.g., and accessible only to) the user's account.

Saving the data or information at a remote location reduces or eliminates any tie between a user and a particular shared computing device. For example, a student can use a different one of the shared computing devices every day, and each day have access to his or her data or information despite different computing devices being used.

In one or more embodiments, the shared computing device supports logins for temporary access. A user logging in for temporary access need not provide user account information. In response to a login request for a user to login into the shared computing device for temporary access, the shared computing device generates a temporary user account. This temporary user account can be generated with a particular name identified randomly, pseudo randomly, using other rules or criteria, and so forth. The user is able to login to the shared computing device using this temporary user account, but in response to the user logging out the temporary user account is deleted from the shared computing device. Thus, no data for the user or other information regarding the temporary user account is maintained on the shared computing device. If the same (or a different user) subsequently requests to login to the shared computing device for temporary access, the shared computing device generates another temporary account rather than re-using the previously generated temporary account. Thus, in contrast to a guest account that persists and can be repeatedly logged into, a temporary user account is not persisted and is not repeatedly logged into (e.g., the temporary user account can be logged into once).

In the discussions herein, reference is made to an education (e.g., school) shared usage environment. However, such a shared usage environment is only an example, and the techniques discussed herein can be used in other shared usage environments. For example, the shared usage environment could be a factory or warehouse floor where employees use devices on the factory or warehouse floor and the shifts constantly change. In such situations, the shared computing devices would be provisioned or configured for a factory or warehouse floor mode. Other examples of shared usage environments include a kiosk environment (e.g., where the shared computing devices are made available to various users via a kiosk), a laboratory environment, and so forth.

Returning to FIG. 1, various different operations can be performed by the shared device setup module 106. In one or more embodiments, the shared device setup module 106 accesses the identity service 112 and identifies the provisioning or configuration of the shared computing devices 104 as a bulk setup. The identity service 112 provides a bulk token that can be included in the configuration package 116, allowing the configuration module 122 on each shared computing device 104 to know that the shared computing device 104 is being setup as part of a bulk configuration or provisioning. The bulk token can be used to allow the shared computing devices 104 to join a tenant (e.g., school, work, etc.) of the identity service 112. The use of the bulk token allows restrictions that the identity service 112 may impose on the number of computing devices that a user can join to the tenant to be bypassed.

In one or more embodiments, a shared usage environment can have a particular set of security settings (e.g., access permissions and restrictions for various different programs, files or folders, network resources, etc.) referred to as a security group. A set of different names for managing the shared computing devices can be associated with the security group and the user can select from those names (e.g., in act 204 of FIG. 2). The shared device setup module 106 can include in the configuration package 116 an indication of this security group and/or the security settings of this security group.

Various different configuration information can be included in the configuration package 116 as discussed above. Various other configuration information can optionally be included in the configuration package 116. The configuration information can include various assets used for a display (e.g., background, wallpaper, start screen, tiles, icons, etc.), such as bitmaps. The configuration information can include a layout description for the shared computing devices 104 (e.g., where tiles or icons are located, what programs or links are available in a menu (e.g., a start menu)), and so forth. The configuration information can include network configuration files (e.g., Wi-Fi configuration files) to setup a network (e.g., a Wi-Fi network) on the shared computing devices 104. The configuration information can include an indication of what applications to install, what files or folders to copy or create on the shared computing devices 104, and so forth.

The configuration information can include various different policy settings to use on the shared computing devices 104. The configuration information can include a configuration file or other indication informing the shared computing devices 104 of what types of accounts to support (e.g., Active Directory® service accounts and/or local accounts). The configuration information can include a package identifier for mobile device management (MDM). MDM can be applied to the shared computing devices 104, which applies various policies to the shared computing devices 104. A package identifier can be generated that identifies a particular set or group of shared computing devices, and each shared computing device 104 can maintain a record of that package identifier. The package identifier can be received from (or provided to) the identity service 112 (which can also implement, or be accessible to, an MDM service). This allows the MDM to treat the shared computing devices 104 with that package identifier as a group (and, for example, unenroll or withdraw all the shared computing devices with a particular package identifier from MDM).

In one or more embodiments, as part of the configuration of the shared computing devices 104, a user of the shared computing device 104 (e.g., the teacher that is setting up the shared computing devices 104) logs into the shared computing device 104. The user credentials are known to the identity service 112, and logging in with those user credentials joins the shared computing device 104 to a particular security group (e.g., for the particular shared usage environment). The user can provide these credentials to the shared computing device 104 manually, or alternatively the user can be automatically logged in based on the configuration information in the configuration package 116. Such configuration information could be, for example, a token provided to the shared device setup module 106 by the identity service 112 that allows such logging in.

It should be noted that, although discussions herein refer to the identity service 112, the techniques discussed herein can be used in environments or systems that include no identity service 112. For example, the identity service 112 may manage a domain and the setup computing device 102 as well as each of the shared computing devices 104 is a member of (joins) that domain. By way of another example, a system may include no identity service 112, in which case each shared computing device 104 operates as a local device that joins no domain.

The configuration information in the configuration package 116 can vary based on whether the system 100 includes an identity service 112. For example, if the system 100 does not include an identity service 112, then the configuration information indicates that the shared computing device only supports local (to the shared computing device 104) account logins. However, if the system 100 does include an identity service 112, then the configuration information indicates that the computing devices 104 may support only a network or identity service account login, or both a local (to the shared computing device 104) account login and a network or identity service account login.

Figure 4:
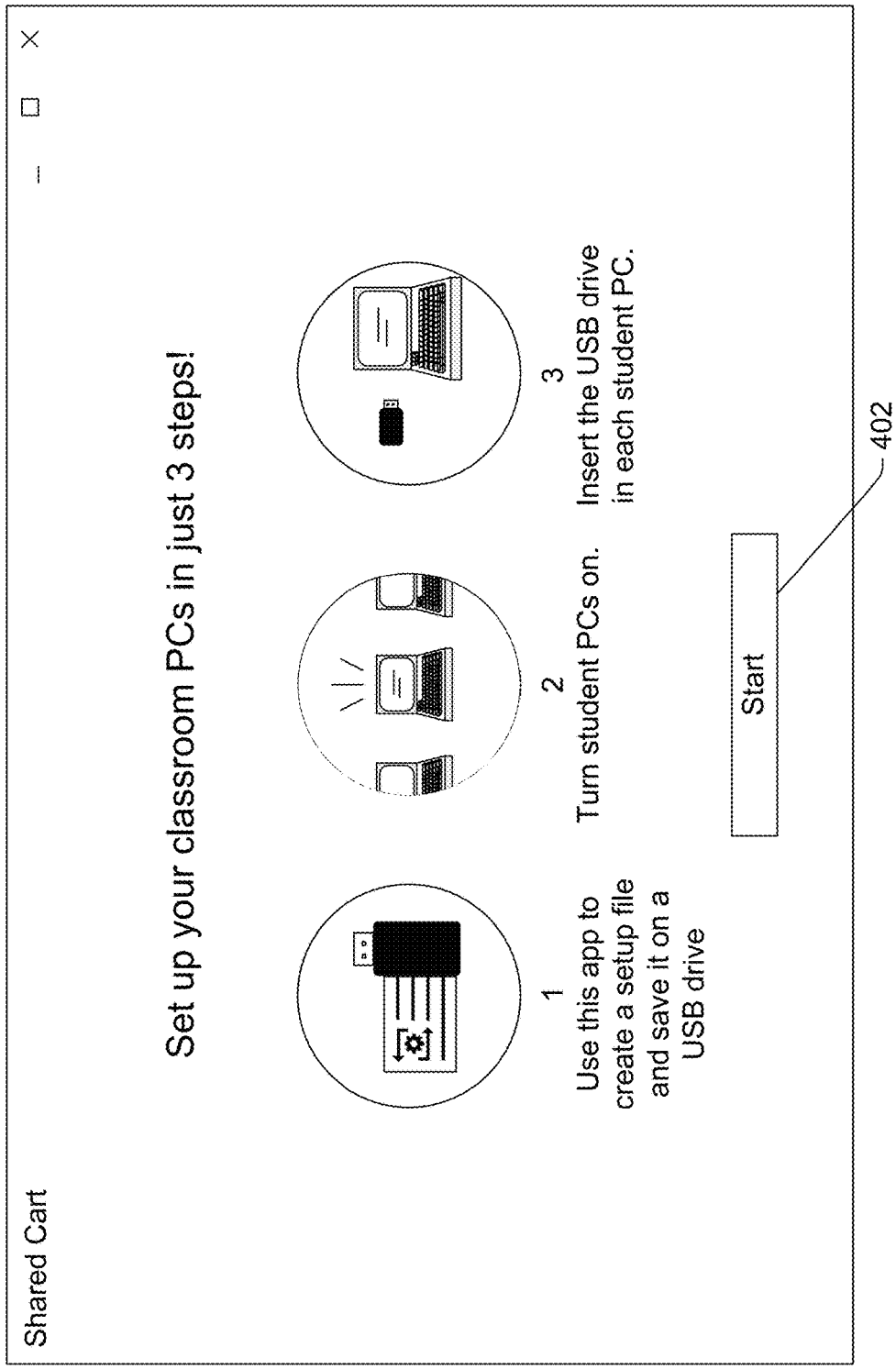

The following is an example of usage of the techniques discussed herein. Assume a teacher has a cart and a stack of new shared computing devices (referred to as PCs in this example). She goes to her desktop computer that is joined to her corporate directory (e.g., a machine that joined or is managed by an Azure™ Active Directory® service). She downloads the setup application (e.g., the shared device setup module 106) from the application store and starts it. In this example, the setup application is called "Set up School PCs". She opens the application and sees the first screen that says set up your classroom PCs in 3 steps, as illustrated in FIG. 4. The first step is about storing a configuration package on a USB drive, the second step is turning the PCs (the shared computing devices) on, and the third step is putting the USB in each PC.

Figure 7:
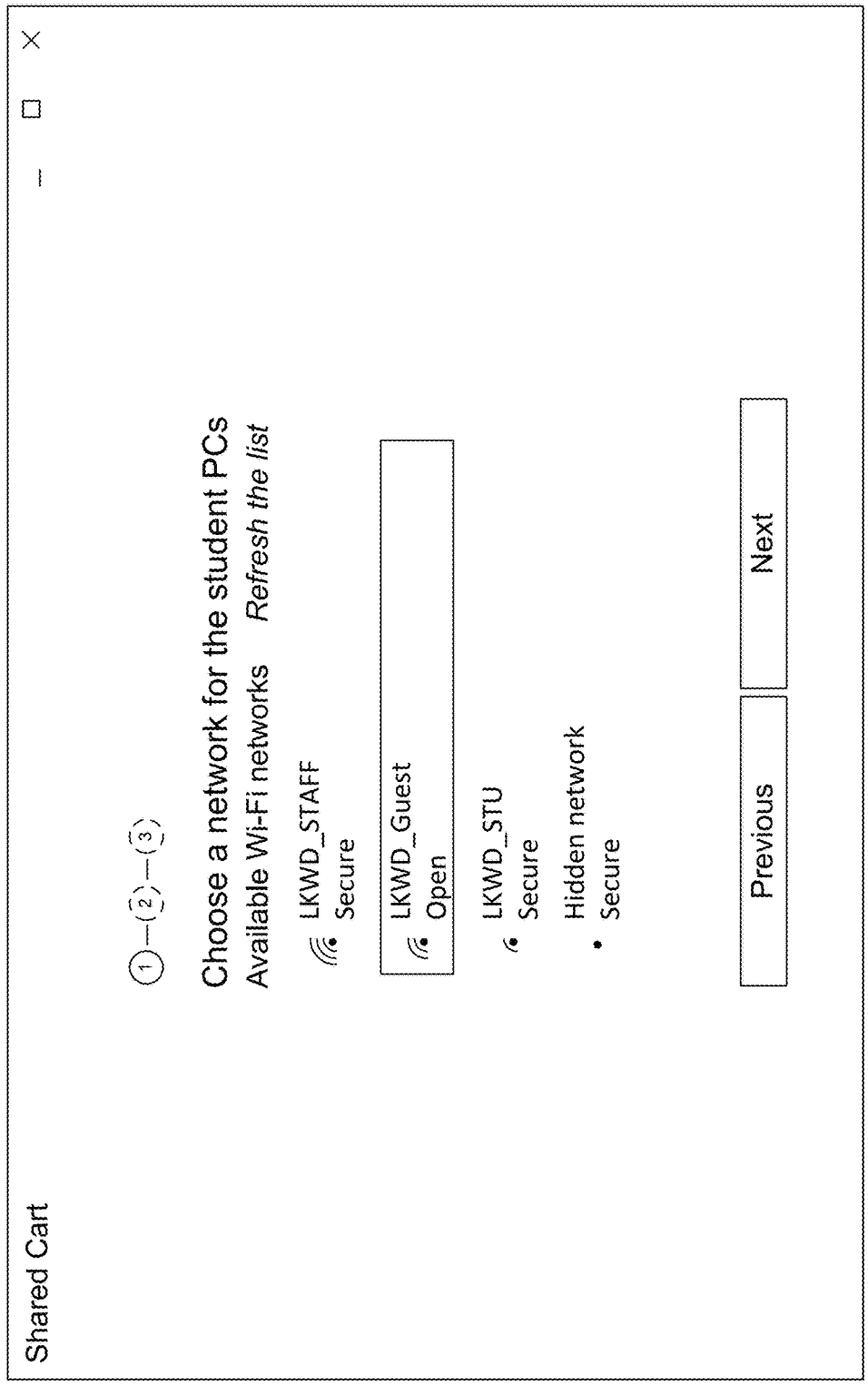

The teacher hits the start button 402 for the setup application, and is prompted to pick a name for the PCs being setup so they can be centrally managed from MDM, as illustrated in FIG. 5. She'll call this set of PCs Lakewood_Cart_2. She'll set it so students have to have an ID to log into the student PCs, as illustrated in FIG. 6. Then she'll select her network from a set of available networks, picking the student network (which is an open network), as illustrated in FIG. 7.

Figure 8:
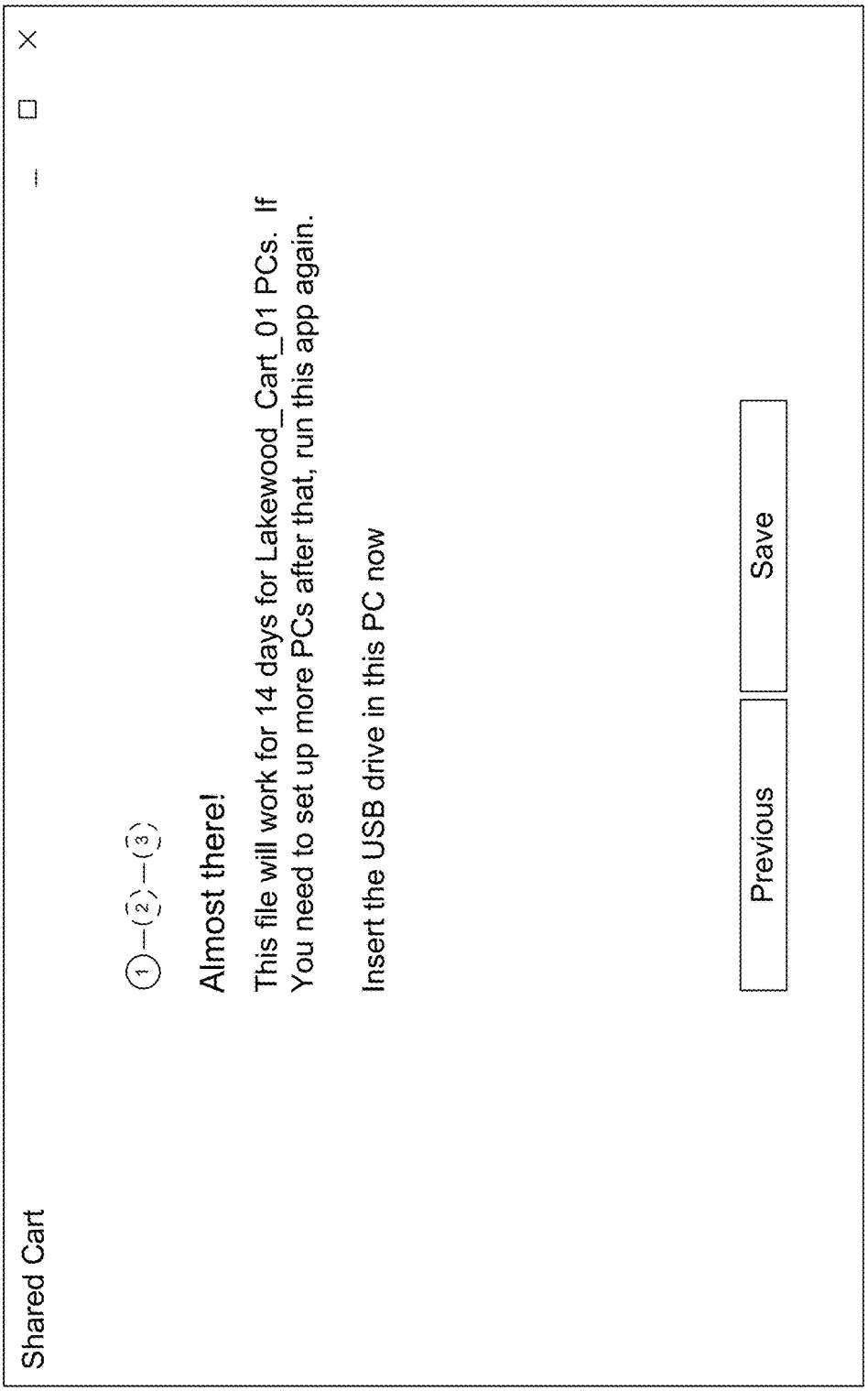
Figure 9:
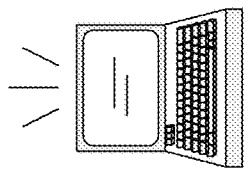
Figure 10:
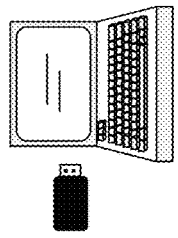

The setup application then tells here to insert her USB drive, as illustrated in FIG. 8. The setup application recognizes that insertion event and copies the configuration package to the USB drive. The setup application then informs the teacher to go over to the student PCs, line them up, plug them in, and turn them on, as illustrated in FIG. 9. The setup application then tells her to remove the USB drive she just put this file on, go over to the first PC that's there and plug it in, as illustrated in FIG. 10. Once she's done this, she's all done with the setup application, so she can close the app and go back to her desktop.

Figure 11:
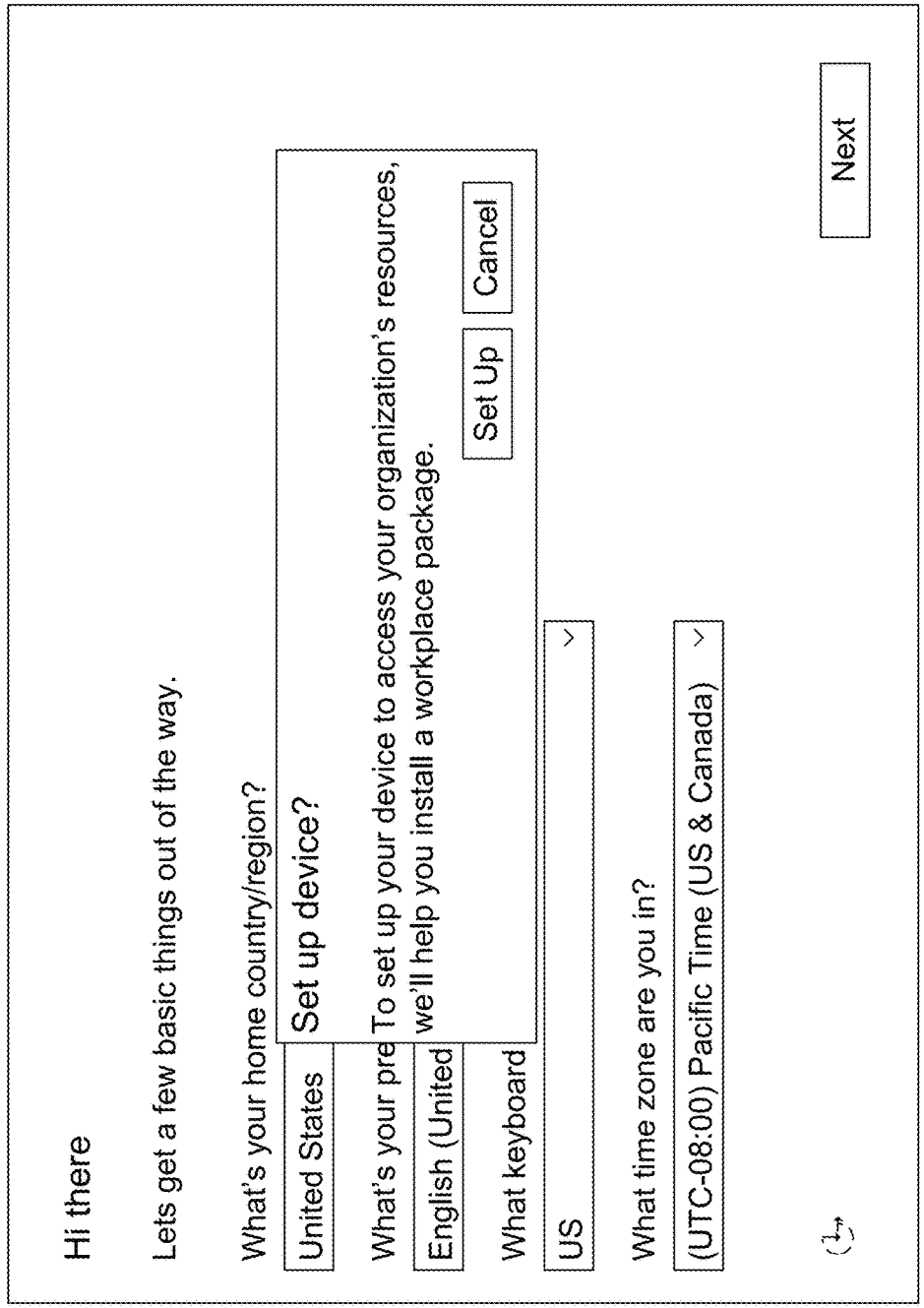
Figure 12:
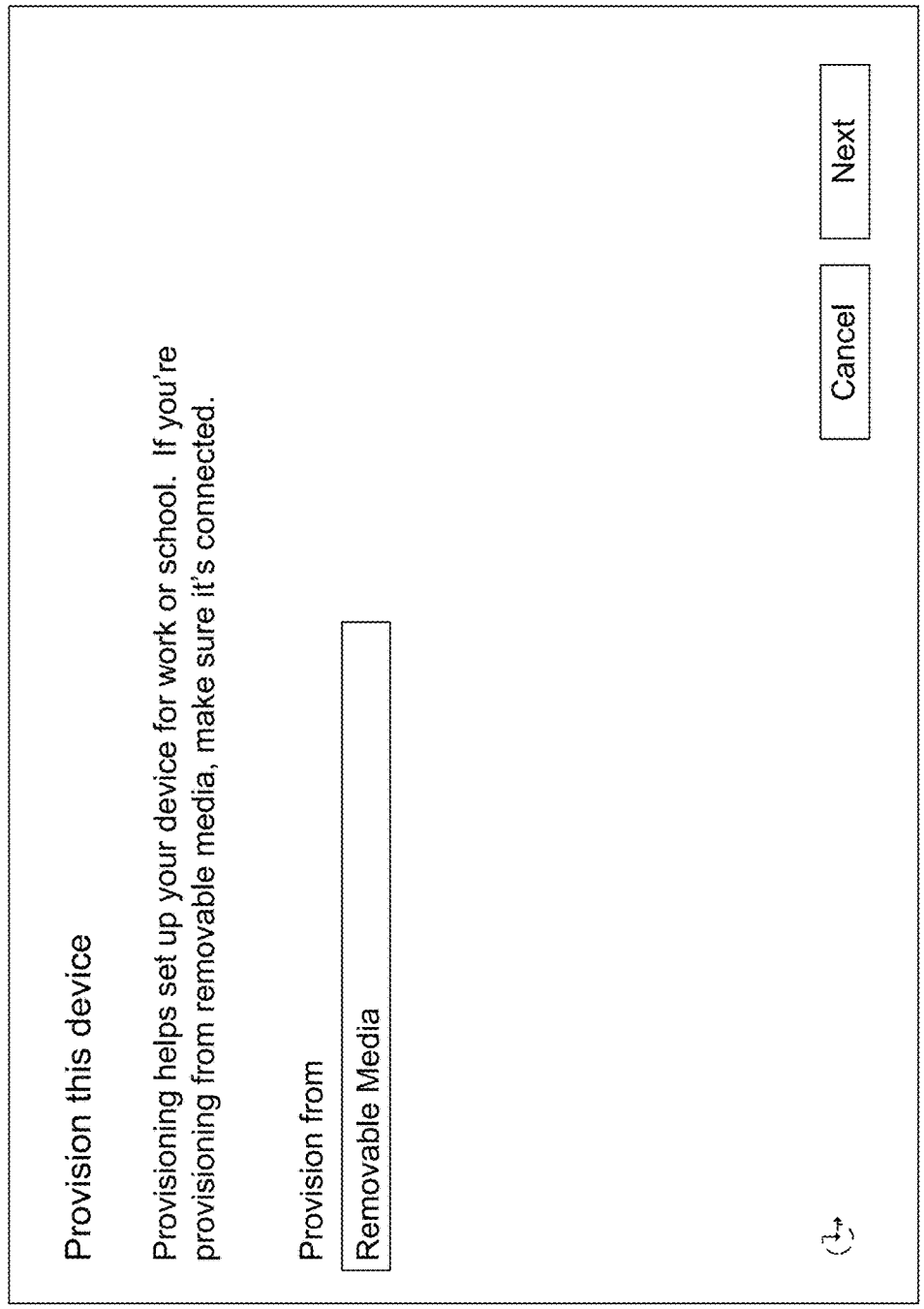

She then takes the USB drive over to a target PC (whichever PC she desires). The target PC is turned on, and once she inserts the USB drive in the target PC, the target PC will recognize that USB drive as including a special configuration package (a shared device configuration package) and it will query her as to whether she is ready to set up the target PC, as illustrated in FIG. 11. The target PC proceeds through an out of the box experience for the target PC, allowing her to proceed with provisioning or configuring the target PC based on the configuration package, as illustrated in FIG. 12. Upon completing the provisioning or configuring of the target PC based on the configuration package, the target PC is all provisioned for the students and ready to go. Alternatively, rather than querying the teacher as to whether she is ready to set up the target PC (e.g., as illustrated in FIG. 11), the target PC can proceed through the out of the box experience for the target PC in response to detecting that the USB drive includes the special configuration package. In such situations, the teacher inserts the USB drive in the target PC and then the provisioning or configuring of the target PC based on the configuration proceeds automatically, alleviating the need for the teacher to do anything other than insert the USB drive into the target PCs to provision or configure the target PCs.

A student can then grab the target PC, which is connected to their school network. The student can log onto the target PC and it will show the school configuration. The student might have done things (e.g., changed settings or created files) on other PCs and that will roam with them from PC to PC. There may be, for example, a pre-configured start screen (a locked down version of a typical start screen), a link to a productivity suite, a cloud or network storage device will be configured, and so forth. The student opens up a word processing application, makes whatever edits she desires to a document, and those edits are stored online such that when she closes the word processing application and logs out of the target PC, the target PC can wipe everything that's been on that device (for her and/or any other user) if the target PC needs the space.

The example discussed with reference to FIGS. 4-12 discusses a teacher downloading and running the setup application to generate and store the configuration package. Alternatively, the configuration package can have been created manually or via the setup application by an administrator or other individual in an information technology (IT) department. The configuration package can then be made available to the teacher (e.g., for download onto a USB drive, or alternatively the USB drive with the configuration package stored on it can be provided to the teacher). In such situations, the teacher is alleviated of the burden of using the setup application to generate and store the configuration package.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 13:
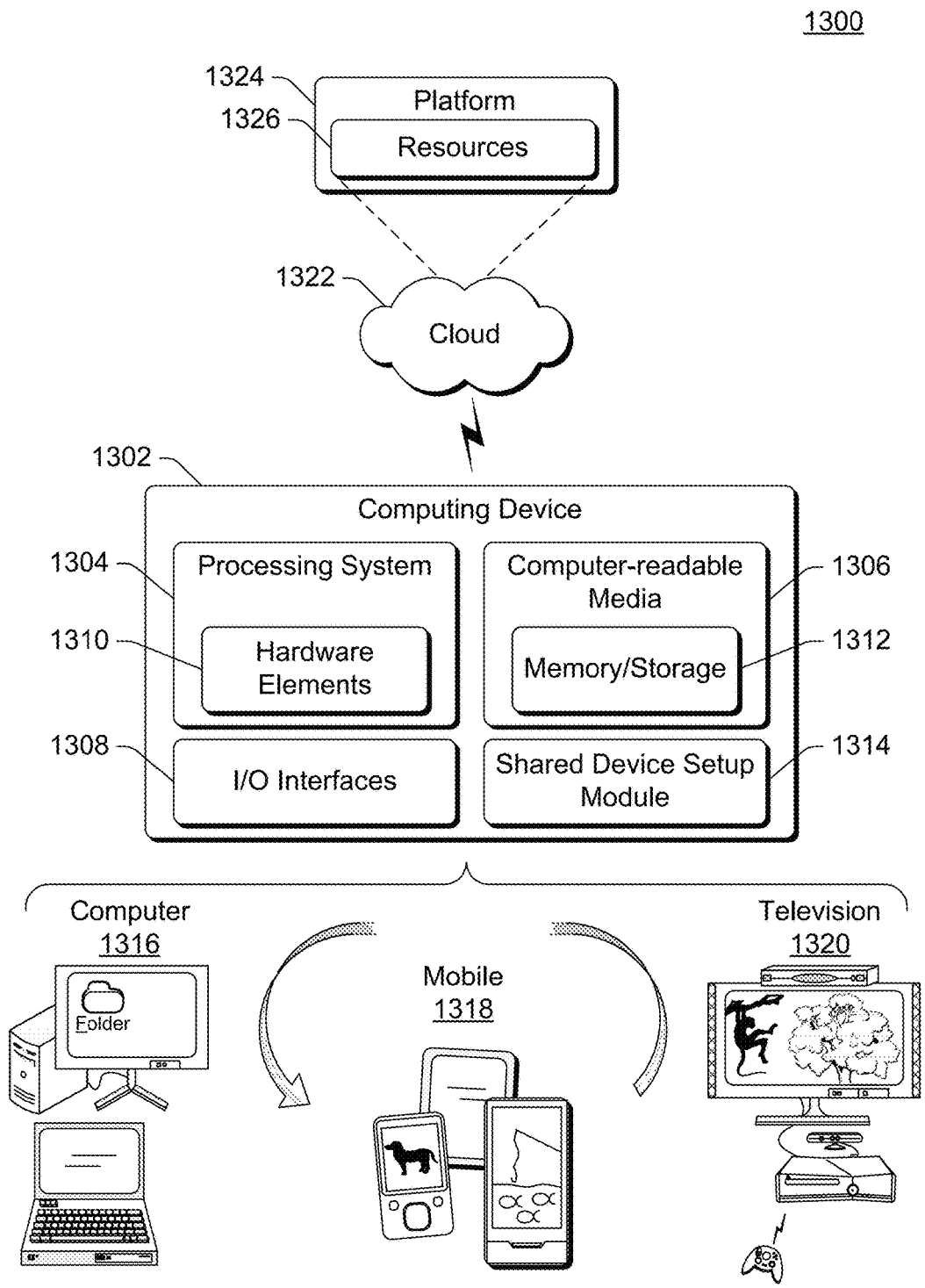
FIG. 13 illustrates an example system generally that includes an example computing device that is representative of one or more systems and/or devices that may implement the various techniques described herein.

FIG. 13 illustrates an example system generally at 1300 that includes an example computing device 1302 that is representative of one or more systems and/or devices that may implement the various techniques described herein. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O Interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

The one or more input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1302 may be configured in a variety of ways as further described below to support user interaction.

In one or more embodiments, the computing device 1302 is a setup computing device, such as the setup computing device 102 of FIG. 1, in which case the computing device 1302 also includes a shared device setup module 1314. The shared device setup module 1314 allows a configuration package to be generated for a set of shared computing devices as discussed above. The shared device setup module 1314 can implement, for example, the shared device setup module 106 of FIG. 1. Alternatively, if the computing device 1302 is a shared computing device, such as one of the shared computing devices 104 of FIG. 1, then the computing device 1302 need not include the shared device setup module 1314 (but would include a configuration module (e.g., a configuration module 122 of FIG. 1) and an operating system analogous to the operating system 124 of FIG. 1).

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1310 and computer-readable media 1306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules as a module that is executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1316, mobile 1318, and television 1320 uses. Each of these configurations includes devices that may have generally different constructs and capabilities, and thus the computing device 1302 may be configured according to one or more of the different device classes. For instance, the computing device 1302 may be implemented as the computer 1316 class of a device that includes a personal computer, desktop computer, a multi-screen computer, laptop computer, netbook, and so on.

The computing device 1302 may also be implemented as the mobile 1318 class of device that includes mobile devices, such as a mobile phone, portable music player, portable gaming device, a tablet computer, a multi-screen computer, and so on. The computing device 1302 may also be implemented as the television 1320 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. This functionality may also be implemented all or in part through use of a distributed system, such as over a "cloud" 1322 via a platform 1324 as described below.

The cloud 1322 includes and/or is representative of a platform 1324 for resources 1326. The platform 1324 abstracts underlying functionality of hardware (e.g., servers) and software resources of the cloud 1322. The resources 1326 may include applications and/or data that can be utilized while computer processing is executed on servers that are remote from the computing device 1302. Resources 1326 can also include services provided over the Internet and/or through a subscriber network, such as a cellular or Wi-Fi network.

The platform 1324 may abstract resources and functions to connect the computing device 1302 with other computing devices. The platform 1324 may also serve to abstract scaling of resources to provide a corresponding level of scale to encountered demand for the resources 1326 that are implemented via the platform 1324. Accordingly, in an interconnected device embodiment, implementation of functionality described herein may be distributed throughout the system 1300. For example, the functionality may be implemented in part on the computing device 1302 as well as via the platform 1324 that abstracts the functionality of the cloud 1322.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a setup computing device, the method comprising: obtaining a shared device setup tool; receiving user input specifying configuration information for a set of shared computing devices, the configuration information including at least one supported login type for the set of shared computing devices, and a network for the set of shared devices; generating a shared device configuration package, the shared device configuration package including the specified configuration information as well as additional configuration information, the additional configuration information including credentials for the set of shared computing devices to access the network; and storing the shared device configuration package for transfer to each shared computing device in the set of shared computing devices.

Alternatively or in addition to any of the above described methods, any one or combination of: the configuration information further including a name for the set of shared computing devices; the storing the shared device configuration package comprising storing the shared device configuration package on a removable universal serial bus (USB) drive; the storing the shared device configuration package comprising encoding both the credentials for the set of shared computing devices to access the network and a uniform resource locator (URL) identifying a location on the network where at least part of the additional configuration information and the specified configuration information can be obtained by the set of shared computing devices; the storing the shared device configuration package comprising encoding both the credentials for the set of shared computing devices to access the network and the URL in a quick response (QR) code, and the method further comprising displaying the QR code on a display device of the setup computing device; the at least one supported login type for the set of shared computing devices comprising a login type requiring users of the set of shared computing devices to login to the shared computing devices with user accounts verified by an identity service on the network; the at least one supported login type for the set of shared computing devices comprising a login type allowing users to login to the shared computing devices anonymously.

A method implemented in a shared computing device, the method comprising: recognizing the presence of a shared device configuration package accessible to the shared computing device; obtaining configuration information identified by the shared device configuration package, the configuration information including credentials for the shared computing device to access a network and types of user logins to be supported by the shared computing device; configuring the shared computing device in accordance with the shared device configuration package; allowing user logins to the shared computing device as indicated by the types of user logins to be supported by the shared computing device; and managing user accounts on the shared computing device over time.

Alternatively or in addition to any of the above described methods, any one or combination of: wherein obtaining the configuration information includes retrieving the configuration information from the configuration package; wherein obtaining the configuration information includes retrieving the configuration information from a network location identified by a URL in the configuration package; the managing user accounts comprising determining that less than a threshold amount of storage space is available on the shared computing device, and deleting, in response to determining that less than the threshold amount of storage space is available on the specialized classifier, one or more user accounts on the shared computing device; the method further comprising receiving a first login request for a user to login to the shared computing device for temporary access, generating a first temporary user account, allowing the user to login to the shared computing device using the first temporary user account, and deleting the first temporary user account from the shared computing device in response to the user logging off the shared computing device; the method further comprising receiving a second login request for a user to login to the shared computing device for temporary access, generating a second temporary user account that is a different temporary account than the first temporary account, allowing the user to login to the shared computing device using the second temporary user account, and deleting the second temporary user account from the shared computing device in response to the user logging off the shared computing device; the recognizing comprising detecting the presence of a USB drive at the shared computing device and recognizing the presence of the shared device configuration package on the USB drive; the recognizing comprising capturing a QR code that encodes a link indicating a network location to access to obtain the configuration information, the obtaining comprising obtaining the configuration information from the network location; the recognizing comprising capturing the QR code as displayed by a setup computing device A shared computing device comprising: a processor; and a computer-readable storage medium having stored thereon multiple instructions that, responsive to execution by the processor, cause the processor to perform operations comprising: recognizing the presence of a shared device configuration package accessible to the shared computing device; obtaining configuration information identified by the shared device configuration package, the configuration information including credentials for the shared computing device to access a network and types of user logins to be supported by the shared computing device; configuring the shared computing device in accordance with the shared device configuration package; allowing user logins to the shared computing device as indicated by the types of user logins to be supported by the shared computing device; and managing user accounts on the shared computing device over time.

Alternatively or in addition to any of the above described computing devices, any one or combination of: the operations further comprising receiving a login request for a user to login to the shared computing device for temporary access, generating a temporary user account, allowing the user to login to the shared computing device using the temporary user account, and deleting the temporary user account from the shared computing device in response to the user logging off the shared computing device; the types of user logins to be supported by the shared computing device comprising a login type requiring users of the shared computing device to login to the shared computing device with user accounts verified by an identity service on the network; the types of user logins to be supported by the shared computing device comprising a login type allowing users to login to the shared computing device anonymously.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a setup computing device, the method comprising:
   accessing a shared device setup tool;
   receiving, through a user interface of the shared device setup tool, user input specifying configuration information for a set of shared computing devices, the configuration information including at least one supported login type for the set of shared computing devices, and a network for the set of shared devices;
   generating a shared device configuration package, the shared device configuration package including the specified configuration information as well as additional configuration information, the additional configuration information including credentials for the set of shared computing devices to access the network;
   providing, through the user interface based on generation of the shared device configuration package, a user interface prompt requesting a connection of a portable storage device with the setup computing device;
   recognizing the connection of the portable storage device;
   storing, based on a recognition of the connection of the portable storage device, the shared device configuration package for transfer to the portable storage device; and
   providing, through the user interface, a user interface sharing prompt requesting that a user connect the portable storage device with a shared computing device of the set of shared computing devices.

2. The method as recited in claim 1, wherein the portable storage device is a universal serial bus (USB) drive.

3. The method as recited in claim 1, wherein the storing of the shared device configuration package further comprises encoding both the credentials for the set of shared computing devices to access the network and a uniform resource locator (URL) identifying a location on the network where at least part of the additional configuration information and the specified configuration information can be obtained by the set of shared computing devices.

4. The method as recited in claim 3, wherein the storing of the shared device configuration package further comprises encoding both the credentials for the set of shared computing devices to access the network and the URL in a quick response (QR) code, and wherein the method further comprising: displaying the QR code on a display device of the setup computing device.

5. The method as recited in claim 1, wherein the at least one supported login type for the set of shared computing devices comprising a login type requiring users of the set of shared computing devices to login to the shared computing devices with user accounts verified by an identity service on the network.

6. The method as recited in claim 1, wherein the at least one supported login type for the set of shared computing devices comprising a login type allowing users to login to the shared computing devices anonymously.

7. The method as recited in claim 6, wherein obtaining the configuration information includes automatically retrieving the configuration information for the shared device configuration package based on the connection of the portable storage device.

8. The method as recited in claim 6, further comprising: managing the temporary user account, wherein the managing of the temporary user account comprises:
   determining that less than a threshold amount of storage space is available on the shared computing device; and
   deleting, in response to determining that less than the threshold amount of storage space is available on the specialized classifier, the temporary user account from the shared computing device.

9. The method as recited in claim 6, further comprising:
   receiving a first login request for the temporary user account to login to the shared computing device for temporary access to the shared usage environment;
   allowing a login to the shared usage environment using the temporary user account; and
   deleting the temporary user account from the shared computing device in response to a logging off of the temporary user account from the shared usage environment.

10. The method as recited in claim 9, further comprising:
   receiving a second login request for a user to login to the shared computing device for temporary access to the shared usage environment;
   generating a second temporary user account that is a different temporary account than the temporary account;

allowing the user to login to the shared usage environment using the second temporary user account; and deleting the second temporary user account from the shared computing device in response to the user logging off the shared usage environment.

11. The method as recited in claim 6, wherein the recognizing comprising detecting a connection of a universal serial bus (USB) drive at the shared computing device, and automatically initiating access to the shared device configuration package based on the connection of the USB drive.

12. The method as recited in claim 6, wherein the recognizing comprising capturing a QR code that encodes a link indicating a network location to access to obtain the configuration information, and wherein the obtaining comprising obtaining the configuration information from the network location.

13. The method as recited in claim 12, wherein the recognizing comprising capturing the QR code as displayed by a setup computing device.

14. The method as recited in claim 1, further comprising: launching, on the shared computing device, an examination environment that enables testing of a student based on the connection of the portable storage device with the shared computing device.

15. The method as recited in claim 1, further comprising: detecting access to the shared usage environment using the temporary user account; and removing the configuration of the shared computing device based on detecting that the temporary user account logs out from the shared usage environment.

16. A method implemented in a shared computing device, the method comprising:

recognizing the presence of a shared device configuration package accessible to the shared computing device based on a connection of a portable storage device;

obtaining configuration information identified by the shared device configuration package, the configuration information including credentials for the shared computing device to access a network and types of user logins to be supported by the shared computing device;

configuring the shared computing device in accordance with the shared device configuration package;

creating, based on a configuration of the shared computing device with the shared device configuration package, a temporary user account for access to a shared usage environment;

launching, based on the configuration of the shared computing device, a user interface for the shared usage environment, wherein the launching comprises providing a customized user interfaced prompt for access to the shared usage environment by the temporary user account, and removing the configuration of the shared computing device based on detecting that the temporary user account logs out from the shared usage environment.

17. A shared computing device comprising:

a processor; and a computer-readable storage medium having stored thereon multiple instructions that, responsive to execution by the processor, cause the processor to perform operations that comprise:

recognizing the presence of a shared device configuration package accessible to the shared computing device based on a connection of a portable storage device;

obtaining configuration information identified by the shared device configuration package, the configuration information including credentials for the shared computing device to access a network and types of user logins to be supported by the shared computing device;

configuring the shared computing device in accordance with the shared device configuration package;

creating, based on a configuration of the shared computing device with the shared device configuration package, a temporary user account for access to a shared usage environment;

launching, based on the configuration of the shared computing device, a user interface for the shared usage environment, wherein the launching comprises providing a customized user interfaced prompt for access to the shared usage environment by the temporary user account; and removing the configuration of the shared computing device based on detecting that the temporary user account logs out from the shared usage environment.

18. The shared computing device as recited in claim 17, the operations further comprising:

receiving a login request for a user to login to the shared computing device for temporary access;

generating the temporary user account;

allowing the user to login to the shared computing device using the temporary user account; and deleting the temporary user account from the shared computing device in response to the user logging off the shared computing device.

19. The shared computing device as recited in claim 17, the types of user logins to be supported by the shared computing device comprising a login type requiring users of the shared computing device to login to the shared computing device with user accounts verified by an identity service on the network.

20. The shared computing device as recited in claim 17, the types of user logins to be supported by the shared computing device comprising a login type allowing users to login to the shared computing device anonymously.

* * * * *